(12) United States Patent
Pakniat et al.

(10) Patent No.: US 9,408,116 B2
(45) Date of Patent: Aug. 2, 2016

(54) METHODS, RADIO BASE STATION AND UE FOR HANDLING CELL RESELECTION

(71) Applicant: Telefonaktiebolaget L M Ericsson (publ), Stockholm (SE)

(72) Inventors: Parisa Pakniat, Norrköping (SE); Samuel Axelsson, Linköping (SE); Sven Ekemark, Storvreta (SE); Mats Folke, Luleå (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 212 days.

(21) Appl. No.: 14/235,385

(22) PCT Filed: Jan. 9, 2014

(86) PCT No.: PCT/SE2014/050013
§ 371 (c)(1),
(2) Date: Jan. 27, 2014

(87) PCT Pub. No.: WO2014/182209
PCT Pub. Date: Nov. 13, 2014

(65) Prior Publication Data
US 2015/0382254 A1    Dec. 31, 2015

Related U.S. Application Data

(60) Provisional application No. 61/820,823, filed on May 8, 2013.

(51) Int. Cl.
*H04Q 7/00* (2006.01)
*H04W 36/00* (2009.01)
(Continued)

(52) U.S. Cl.
CPC ...... *H04W 36/0055* (2013.01); *H04W 36/0033* (2013.01); *H04W 36/04* (2013.01); *H04W 36/16* (2013.01); *H04W 48/12* (2013.01); *H04W 48/16* (2013.01); *H04W 88/02* (2013.01); *H04W 88/08* (2013.01)

(58) Field of Classification Search
USPC .......................................... 370/328, 252, 331
See application file for complete search history.

(56) References Cited

U.S. PATENT DOCUMENTS 7,437,178 B2 * 10/2008 Jeong ................ H04W 36/0055
370/331
2009/0238117 A1    9/2009 Somasundaram et al.
(Continued)

OTHER PUBLICATIONS

Author Unknown, "Cell-specific prioritisation at reselection," Ericsson, Agenda Item 7.1.1 Tdoc R2-131668, 3GPP TSG-RAN WG2 #82, May 20-24, 2013, Fukuoka, Japan, 5 pages.
(Continued)

*Primary Examiner* — Duc C Ho
(74) *Attorney, Agent, or Firm* — Withrow & Terranova, PLLC

(57) ABSTRACT

There is provided a method in a radio base station for handling cell reselection for a user equipment, UE, in a wireless communications network. The UE is associated with a first cell of the radio base station, which first cell has a first frequency. The wireless communications network comprises a second cell having a second frequency, which second cell has at least partly overlapping coverage with the first cell, and a third cell having the second frequency, which third cell has at least partly overlapping coverage with the first cell. The radio base station transmits cell reselection priority values to the UE, wherein the cell reselection priority values comprise a first priority value for the second cell, and a second priority value for the third cell.

16 Claims, 8 Drawing Sheets

(51) Int. Cl.
*H04W 48/12* (2009.01)
*H04W 48/16* (2009.01)
*H04W 36/04* (2009.01)
*H04W 36/16* (2009.01)
*H04W 88/02* (2009.01)
*H04W 88/08* (2009.01)

(56) References Cited

U.S. PATENT DOCUMENTS

| | | | |
|---|---|---|---|
| 2010/0216469 A1 | 8/2010 | Yi et al. | |
| 2012/0213161 A1* | 8/2012 | Maeda | H04L 5/0042 370/328 |
| 2012/0276916 A1* | 11/2012 | Kazmi | G01S 5/0205 455/452.1 |
| 2013/0223409 A1* | 8/2013 | Jung | H04W 36/20 370/331 |
| 2014/0004862 A1* | 1/2014 | Ekemark | H04W 72/06 455/443 |

OTHER PUBLICATIONS

Boixadera, Francesc, "Radio Resource Management," Chapter 13, "LTE—The UMTS Long Term Evolution: From Theory to Practice," John Wiley & Sons, Feb. 2009, pp. 301-321.

Simsek, Meryem et al., "Cell Selection Modes in LTE Macro-Femtocell Deployment," Chapter 10, "Heterogeneous Cellular Networks," First Edition, John Wiley & Sons, Apr. 3, 2013, pp. 215-245.

International Search Report and Written Opinion for PCT/SE2014/050013, mailed Jun. 3, 2014, 12 pages.

3GPP TS 36.304, "3rd Generation Partnership Project; Technical Specification Group Radio Access Network; Evolved Universal Terrestrial Radio Access (E-UTRA); User Equipment (UE) Procedures in Idle Mode (Release 11)," V11.2.0., Dec. 2012, 33 pages.

3GPP TS 36.331, "3rd Generation Partnership Project; Technical Specification Group Radio Access Network; Evolved Universal Terrestrial Radio Access (E-UTRA); Radio Resource Control (RRC); Protocol Specification (Release 11)," V11.2.0., Dec. 2012, 340 pages.

* cited by examiner

METHODS, RADIO BASE STATION AND UE FOR HANDLING CELL RESELECTION

TECHNICAL FIELD

Embodiments herein relate to mobile telecommunications, and in particular to cell reselection. More specifically, embodiments herein relate to a radio base station, a user equipment and methods performed therein for handling cell reselection for the user equipment.

BACKGROUND

Development within wireless technology has been, and still is, on rampage. The use of wireless communications networks, sometimes also referred to as cellular communications networks, cellular radio system or cellular networks, continues to grow rapidly. New wireless technologies and standards are constantly emerging. Universal Mobile Telecommunications System (UMTS) is a third generation mobile communication system, which evolved from the Global System for Mobile Communications (GSM) and is intended to provide improved mobile communication services based on Wideband Code Division Multiple Access (WCDMA) access technology. UMTS Terrestrial Radio Access Network (UTRAN) is essentially a radio access network using wideband code division multiple access. The 3rd Generation Partnership Project Long Term Evolution (3GPP LTE), which may be referred to as Evolved UTRAN (E-UTRAN), has undertaken to evolve further the UTRAN and GSM based radio access network technologies, and 3GPP LTE radio access standard has been written in order to support high bitrates and low latency both for uplink and downlink traffic.

A user equipment (UE) which for instance may be represented by a mobile terminal, wireless terminal or mobile station, may be enabled to communicate wirelessly in any of such wireless communications networks. A wireless communications network may cover a geographical area which is divided into cell areas, wherein each cell area is served by a base station. A cell is the geographical area where radio coverage is provided by the base station at a base station site. Each base station may serve one or several cells, and furthermore, each base station may support one or several communication technologies and be directly connected to one or more core networks. Depending on the technology and terminology used, a base station may be referred to as e.g. a Radio Base Station (RBS), Base Transceiver Station (BTS), B node, NodeB, Evolved Node B (eNodeB), or eNB, and the term "base station" is used in this description to denote any of these. The base stations may communicate over the air interface operating on radio frequencies with the UEs within range of the base stations.

A UE may be subjected to handover from one cell to another. One reason may for instance be that more efficient utilization of capacity is sought after, and another that the UE is moving away from an area covered by one cell—the source cell—and is entering an area covered by another cell—e.g. a target cell—which therefore provides better radio conditions for the UE.

Commonly, a UE in idle mode measures the signal level of cells in the current frequency and also signal levels of cells in other frequencies and other Radio Access Technologies (RATs). Different frequencies and RATs may be prioritized differently. This prioritization is provided by a base station, such as e.g. an eNB, to the UE as a part of System Information (SIB) or by an RRCConnectionRelease message. The UE in idle mode is supposed to follow this prioritization when performing measurements for cell selection or reselection.

Measurements on lower priority frequencies/RAT are commonly only performed when the serving cell's signal level is less than a defined threshold. Measurements on higher prioritized frequencies/RATs are commonly always performed.

If several cells are found on frequencies with equal priority, the strongest one is selected, considering the configured offsets and hysteresis. The cell selection criterion, S criteria, and cell ranking criterion, R criteria, are specified in 3GPP TS 36.304, "User Equipment (UE) procedures in idle mode", Rel-11 (V11.2.0).

In a prior art example configuration illustrated in FIG. 1, a cell 1, which is located on a first frequency f1, and a cell 2, which is located on a second frequency f2, are assumed to be macro cells with generally moderate/high load. Cell 3 is a pico cell, located on the same second frequency f2 as cell 2, adding extra capacity in its coverage area.

The coverage area of a pico cell like cell 3 is often small. Fully utilizing the capacity of a pico cell might not be possible, because the number of UEs within coverage is too small. It is, however, desired that all UEs located within the coverage area of cell 3 shall camp on this cell, in order to utilize the capacity, and in order to offload the macro cells 1 and 2, as far as possible.

Connected mode load balancing is commonly applied between the macro cells 1 and 2. It distributes the UEs evenly between those two cells, ensuring consistent end user performance in these two cells. The idle mode cell reselection in these two cells is typically configured to preserve the UE distribution the load balancing achieves in connected mode. It reduces the need for recurring load balancing actions when the UEs reconnect after periods in idle mode.

In connected mode, UEs connected to cell 2 are commonly relocated to cell 3 when entering the cell 3 coverage. This is achieved with intra-frequency mobility in connected mode, with support in the existing technology.

UEs connected to cell 1, on the other hand, tend to stay connected to cell 1, although they may enter the coverage of cell 3. One way to move UEs to cell 3 is by means of the connected mode load balancing. However, since cell 3 has a relatively small coverage area, it requires a lot of inter-frequency measurements in cell 1 in order to identify UEs within coverage of cell 3 hence suitable for relocation.

SUMMARY

It is therefore an object of embodiments herein to provide an improved cell reselection priority process.

According to a first aspect of embodiments herein, the object is achieved by a method in a radio base station for handling cell reselection for a user equipment, UE, in a wireless communications network. The UE is associated with a first cell of the radio base station, which first cell has a first frequency. Furthermore, the wireless communications network comprises a second cell having a second frequency. The second cell has at least partly overlapping coverage with the first cell. The wireless communications network further comprises a third cell having the second frequency. The third cell has at least partly overlapping coverage with the first cell. The radio base station transmits cell reselection priority values to the UE. The cell reselection priority values comprise a first priority value for the second cell, and a second priority value for the third cell.

According to a second aspect of embodiments herein, the object is achieved by a method in a user equipment, UE, for handling cell reselection in a wireless communications network. The UE is associated with a first cell of a radio base station, which first cell has a first frequency. Furthermore, the wireless communications network comprises a second cell having a second frequency. The second cell has at least partly overlapping coverage with the first cell. The wireless communications network further comprises a third cell having the second frequency. The third cell has at least partly overlapping coverage with the first cell. The UE receives cell reselection priority values from the radio base station. The cell reselection priority values comprise a first priority value for the second cell, and a second priority value for the third cell. Furthermore, the UE performs measurements on the cell having the highest priority according to the priority values received.

According to a third aspect of embodiments herein, the object is achieved by a radio base station adapted for handling cell reselection for a user equipment, UE, in a wireless communications network. The UE is associated with a first cell of the radio base station, which first cell has a first frequency. Furthermore, the wireless communications network comprises a second cell having a second frequency. The second cell has at least partly overlapping coverage with the first cell. The wireless communications network further comprises a third cell having the second frequency. The third cell has at least partly overlapping coverage with the first cell. The radio base station is configured to transmit cell reselection priority values to the UE. The cell reselection priority values comprise a first priority value for the second cell, and a second priority value for the third cell.

According to a fourth aspect of embodiments herein, the object is achieved by a user equipment, UE, adapted for handling cell reselection in a wireless communications network. The UE is associated with a first cell of a radio base station, which first cell has a first frequency. Furthermore, the wireless communications network comprises a second cell having a second frequency. The second cell has at least partly overlapping coverage with the first cell. The wireless communications network further comprises a third cell having the second frequency. The third cell has at least partly overlapping coverage with the first cell. The UE is configured to receive cell reselection priority values from the radio base station. The cell reselection priority values comprise a first priority value for the second cell, and a second priority value for the third cell. The UE is furthermore configured to perform measurements on the cell having the highest priority according to the priority values received.

In the existing technology in the prior art, the cell reselection priority or the cell reselection priority value is defined per frequency which implies the same priority level for all cells on the same frequency. In several network scenarios, however, it is beneficial, and even essential, to prioritize cells on the same frequency differently. Embodiments herein thus introduce a cell specific reselection priority in that the reselection priority values comprise priority values for the different cells.

Embodiments herein increase the granularity of the cell reselection priorities from frequency level to cell level, i.e. to be per cell rather than just per frequency when it is desired.

For that reason, the cell reselection priority process has been improved.

An advantage of embodiments herein may be that, by adding the cell specific priorities on top of the frequency specific priorities for cell reselection, cells on the same frequency may be prioritized differently. This facilitates to utilize the cells with high capacity and small coverage with the help of idle mode behavior, without flooding the potentially existing macro cell on the same frequency.

BRIEF DESCRIPTION OF THE DRAWINGS

Examples of embodiments herein are described in more detail with reference to attached drawings, in which.

DETAILED DESCRIPTION

As part of developing embodiments herein, a problem has been identified and will first be discussed.

Figure 1:
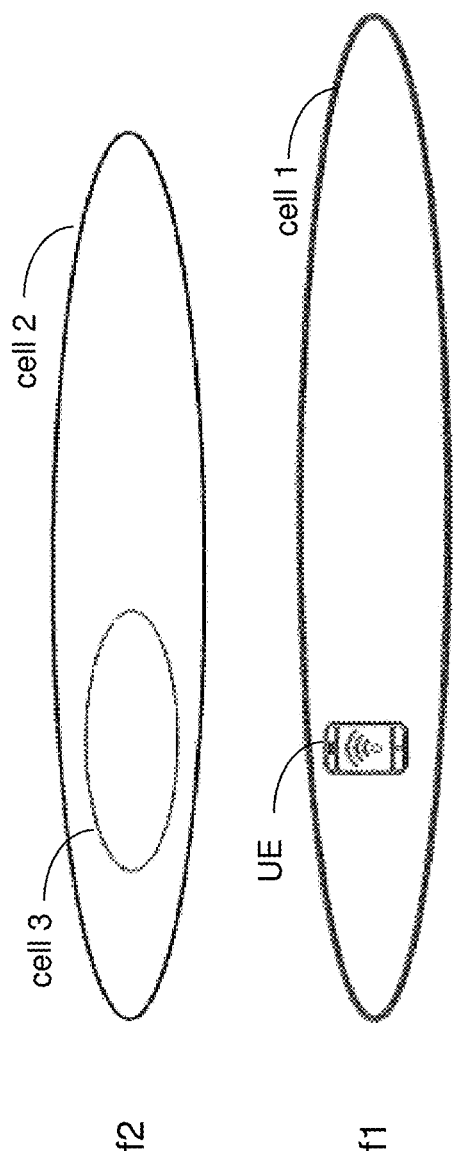
FIG. 1 is a schematic view illustrating a source cell Cell1 of source frequency f1, and cells Cell2 and Cell3 of target frequency f2, as known in prior art.

With reference to FIG. 1, for instance in order to overcome the obstacle of UEs within the coverage of cell 3 staying camped on cell 1, it would be desirable that:

UEs in idle mode, camped on cell 1, autonomously perform inter-frequency measurements and detects when they enter the coverage of cell 3.

UEs in idle mode, camped on cell 1, autonomously perform cell reselection to cell 3 when cell 3 becomes good enough.

UEs in idle mode, camped on cell 1, avoid cell reselection to cell 2, as far as possible, in order not to unnecessarily affecting the load balance between cell 1 and cell 2.

This kind of arrangement would minimize the negative impact on the load balancing between cell 1 and cell 2, at the same time much improving the utilization of the capacity available in cell 3. It can be achieved without a large number of UEs connected to cell 1 having to perform inter-frequency measurements to identify those within coverage of cell 3.

This type of scenario may happen in different network deployment such as Het-Net deployments with mixture of macro and micro/pico cells on the same frequency layer (ex. sports stadiums or shopping malls), or migration phase when replacing macro cells on a frequency layer with smaller cells.

In these scenarios it is usually desired to prioritize the pico/micro cells, such as e.g. cell 3, over macro cells, such as e.g. cell 2, on the same frequency, such as e.g. the second frequency f2, in order to utilize their capacity in a more efficient way.

Why Not Using q-OffsetCell Instead?

As explained in 3GPP TS 36.304, "User Equipment (UE) procedures in idle mode", Rel-11 (V11.2.0), the existing parameter q-OffsetCell is used in cell reselection when ranking the cells on intra-frequency or "equal priority inter-frequency".

The question may be risen if it is possible to apply this offset to achieve the desired behavior explained above, i.e. all UEs located within the coverage area of cell 3 camp on this cell.

In order to achieve that result, cell 1, which is a macro cell on f1, should broadcast same idle mode priority level for both source frequency f1 and target frequency f2 and specify cell specific offset for cell2, which is a macro cell on f2, and cell3, which is a pico cell on f2, in a way that cell3 should be chosen first (as the example in table below):

|  | CRP broadcasted in cell1 (f1) | CRP broadcasted in cell2 (f2) | CRP broadcasted in cell3 (f2) |
| --- | --- | --- | --- |
| Frequency 1 (f1) | Prio 5 | Prio 4 | Prio 4 |
| Frequency 2 (f2) | Prio 5 | Prio 5 q-OffsetCell2 (e.g.: +10) q-OffsetCell3 (e.g.: −10) | Prio 5 |

However, there are several drawbacks with this configuration.

By setting a large negative offset for cell 3, there is a risk that this cell is prioritized over cell1 in the areas out of the good coverage of cell 3. After the UE reselects to cell3, it will trigger another reselection either to cell 1 or cell 2, depending on the configuration, which both options are in contrast with the desired behaviour (as will be further explained later on with reference to FIG. 6). On the other hand, applying a large positive offset for cell 2 may prohibit cell reselection to that cell even when the UE in cell 1 experiences poor coverage (as will be further explained later on with reference to FIG. 7).

Due to these issues, the parameter qOffsetCell cannot be used to solve the problem and a new approach is required.

According to embodiments herein, relating to handling cell reselection for a UE in a wireless communications network, the granularity of the cell reselection priorities may, as previously indicated and as will be shown down below, be increased from frequency level to cell level, i.e. to be per cell rather than just per frequency when it is desired.

Figure 2:
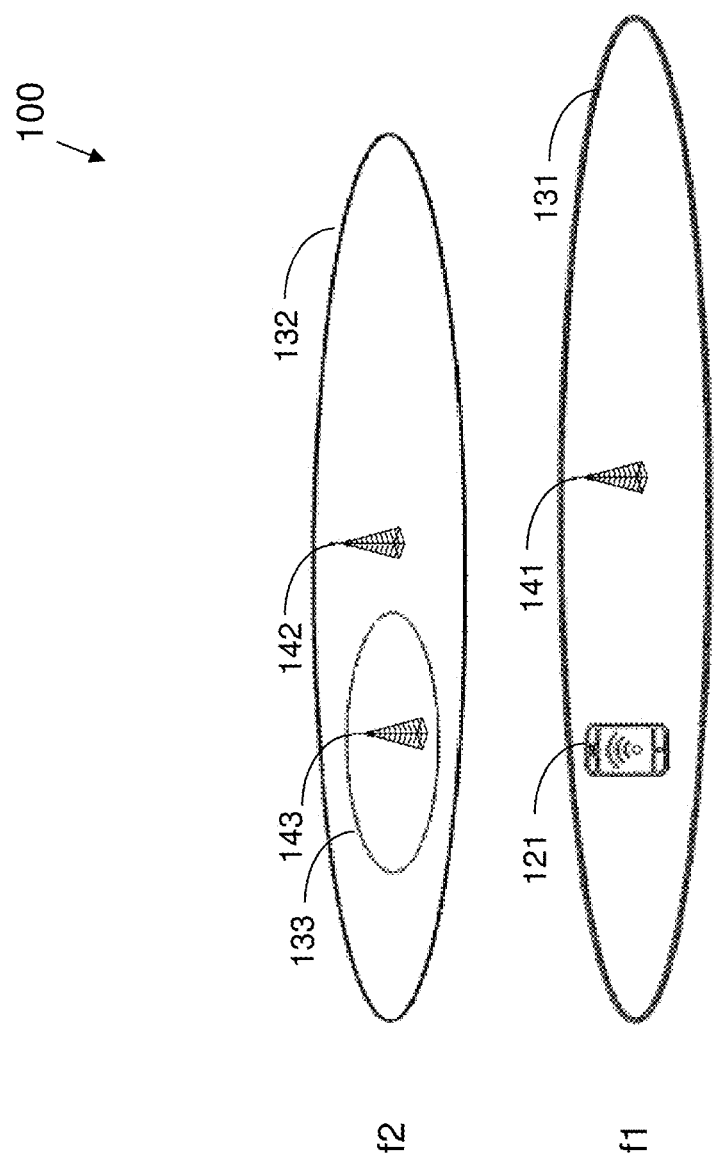
FIG. 2 is a schematic view illustrating a communications network according to exemplifying embodiments herein.

FIG. 2 depicts a wireless communications network 100 in which embodiments herein may be implemented. In the example scenario of FIG. 2, the network 100 may be an E-UTRAN network which may be referred to as a 3GPP LTE network, e.g. an LTE Frequency Division Duplex (LTE FDD), LTE Time Division Duplex (LTE TDD), or LTE Half-Duplex FDD (LTE HD-FDD) network. In other embodiments, the wireless communications network 100 may be a network such as a WCDMA, UTRA TDD, GSM, GERAN, enhanced data rate for GSM evolution (EDGE) network comprising of any combination of Radio Access Technologies (RATs) such as e.g. Multi-Standard Radio (MSR), base stations, multi-RAT base stations etc., Wimax, or any cellular network or system.

A number of UEs may be located in the wireless communications network 100. Each UE may be capable of communicating with another UE, with a regular telephone and/or with a server via the wireless communications network 100, and possibly via one or more core networks which may be comprised within the wireless communications network 100. In the example scenario of FIG. 2, a single user equipment (UE) 121 is depicted. According to embodiments herein, the user equipment 121 may be a mobile terminal or wireless terminal, a mobile phone, a computer such as e.g. a laptop, a Personal Digital Assistant (PDA) or tablet computer, sometimes referred to as a surf plate, with wireless capability, a Machine to Machine (M2M) device or any other radio network unit capable to communicate with the wireless communications network 100, or for example, a portable, pocket-storable, hand-held, computer-comprised, or vehicle-mounted mobile device, enabled to communicate voice and/or data, via the wireless communications network 100, with another entity, such as another terminal or a server.

The wireless communications network 100 covers a geographical area which is divided into a plurality of cell areas. In the example scenario of FIG. 2, there is depicted a first source cell 131 located on a first frequency f1 and a second cell 132 located on a second frequency f2, said first cell 131 and said second cell 132 being assumed to be macro cells with generally moderate/high load. Furthermore, a third cell 133 is depicted, which third cell 133 is a pico cell located on the same frequency as the second cell 132, i.e. the second frequency f2, adding extra capacity in its coverage area.

The wireless communications network 100 furthermore comprises any number of network nodes such as base stations providing radio coverage in the cells and various management nodes, which may communicate with each other through applicable interfaces. A base station may be a RBS, BTS, B node, eNodeB, eNB, or NodeB, and may be of different classes, such as e.g. a macro eNodeB, home eNodeB or pico base station, based on transmission power and thereby also cell size. In the example scenario of FIG. 2, only three network nodes are depicted for simplicity. According to embodiments herein, the network nodes are radio base stations (RBSs), why in FIG. 2 there is depicted a first radio base station 141, a second radio base station 142, and a third radio base station 143. Although not always the case, in FIG. 2, the first radio base station 141 serves the first source cell 131, the second radio base station 142 serves the second cell 132, and the third radio base station 143 serves the third cell 133, thus providing radio coverage in the respective cells 131, 132, 133.

It should be noted that throughout the description, referring to the radio base station is synonymous with referring to the first radio base station 141.

Furthermore, the second cell 132 may or may not be associated with the radio base station 141. The third cell 133 may or may not be associated with the radio base station 141.

An example of embodiments of a method in the radio base station 141 for handling cell reselection for the UE 121 in the wireless communications network 100 will now be described with reference to a flowchart depicted in FIG. 3 and with further reference to FIG. 2.

Figure 3:
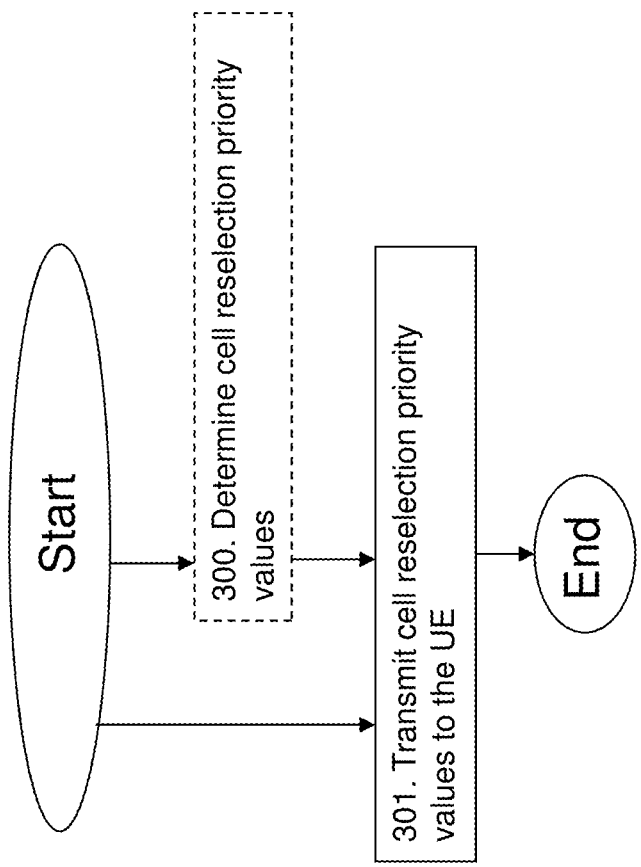
FIG. 3 depicts a flowchart showing actions of a method in a radio base station, according to exemplifying embodiments herein.

In the example scenario of FIG. 3, the network 100, the radio base stations 141, 142, 143 and the cells 131, 132, 133 depicted in FIG. 2 may refer to an E-UTRAN network commonly referred to as an LTE network, although this method is not limited to any particular type of wireless communications network and nodes therein. Here, the method is discussed in terms of actions that may be performed by the radio base station, i.e. the first radio base station 141, which may also be referred to as the source eNodeB.

Preceding the actions of the flowchart depicted in FIG. 3, it is assumed that the UE 121 is associated with the first cell 131 of the radio base station 141, which first cell 131 has the first frequency f1. Furthermore, the communication network 100 comprises the second cell 132 having the second frequency f2, which second cell 132 has at least partly overlapping coverage with the first cell 131. Additionally, the communication network 100 comprises the third cell 133 having the second frequency f2, which third cell 133 has at least partly overlapping coverage with the first cell 131.

The method of FIG. 3 comprises the following actions, which actions may be taken in any suitable order. Dashed lines of some boxes in FIG. 3 indicate that these actions are optional and not mandatory.

Action 300

In optional action 300, the radio base station 141 may determine cell reselection priority values.

Determining cell reselection priority values may for instance comprise the radio base station 141 creating a message, which message comprises the cell reselection priority values.

Action 301

The radio base station 141 transmits the cell reselection priority values to the UE 121. The cell reselection priority values comprise a first priority value for the second cell 132, and a second priority value for the third cell 133.

Thereby, a cell specific reselection priority is introduced, which increase the granularity of the cell reselection priorities from frequency level to cell level, i.e. to be per cell, such as e.g. the second cell 132 or the third cell 133, rather than just per frequency.

According to embodiments herein, the first priority value and the second priority value may be different.

Thereby, cells on the same frequency, such as e.g. the second and third cells 132, 133 on the second frequency f2, may be prioritized differently.

Furthermore, according to embodiments herein, the cell reselection priority values are transmitted via system information and/or in a dedicated Radio Resource Control (RRC) message.

Thereby, system information and/or RRC messages utilized in the prior art may be reused for providing the cell reselection priority values.

According to further embodiments herein, the cell reselection priority values are transmitted via the system information, which system information may comprise Information Element (IE) SystemInformationBlockType5 (SIB5).

Thereby, IE SIB5, which includes neighboring cell related information relevant for inter-frequency cell reselection, is proposed to be utilized for providing the cell reselection priority values.

The cell reselection priority values may be transmitted via a first information field, which first information field may be an extension of the SIB5 interFreqNeighCellList.

Thereby, it is proposed that IE SIB5 is updated with a new parameter specifying cell specific priority for cell reselection procedure.

According to alternative embodiments herein, the cell reselection priority values are transmitted via the dedicated RRC message, which dedicated RRC message comprises an RRC-ConnectionRelease message.

Thereby, an RRC Connection Release message is proposed to be utilized for providing the cell reselection priority values.

The cell reselection priority values may be transmitted via a second information field, which second information field may be an extension of the freqPriorityListEUTRA field of the RRCConnectionRelease message.

Thereby, it is proposed that RRCConnectionRelease is updated with a new parameter specifying cell specific priority for cell reselection procedure.

To sum up, the actions above describe an approach in which cell specific priorities are added on top of the frequency specific priorities for cell reselection. Accordingly, the actions performed in the radio base station 141 may enable for cells on the same frequency, such as e.g. the second and third cells 132, 133 on the second frequency f2, to be prioritized differently.

An example of possible embodiments of a method in the UE 121 for handling cell reselection in the wireless communications network 100, will now be described with reference to a flowchart depicted in FIG. 4 and with further reference to FIG. 2. The example scenario of FIG. 4 corresponds to potentially interact with the example scenario of FIG. 3, such that alternatives and embodiments described in conjunction with FIG. 3 to great extent may apply as well to FIG. 4. The method of FIG. 4 is discussed seen from the perspective of the UE 121.

Figure 4:
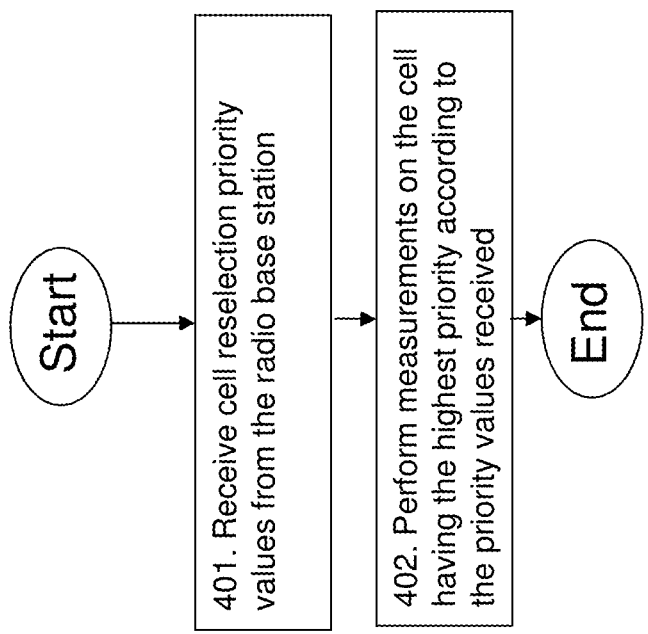
FIG. 4 depicts a flowchart showing actions of a method in a UE, according to exemplifying embodiments herein.

In an example scenario, preceding the actions of the flowchart depicted in FIG. 4, it is, as previously mentioned, assumed that the UE 121 is associated with the first cell 131 of the radio base station 141, which first cell 131 has the first frequency f1. Furthermore, the communications network 100 comprises the second cell 132 having the second frequency f2, which second cell 132 has at least partly overlapping coverage with the first cell 131. Additionally, the communications network 100 comprises the third cell 133 having the second frequency f2, which third cell 133 has at least partly overlapping coverage with the first cell 131.

The method of FIG. 4 comprises the following actions, which actions may be taken in any suitable order.

Action 401

The UE 121 receives cell reselection priority values from the radio base station 141. The cell reselection priority values comprise a first priority value for the second cell 132, and a second priority value for the third cell 133.

This action corresponds to Action 301 of the radio base station 141.

According to embodiments herein, the first priority value and the second priority value are different.

Furthermore, the cell reselection priority values may be transmitted via system information and/or in a dedicated RRC message.

According to further embodiments herein, the cell reselection priority values are transmitted via the system information, which system information comprises Information Element (IE) SystemInformationBlockType5 (SIB5).

The cell reselection priority values may be transmitted via a first information field, which first information field may be an extension of the SIB5 interFreqNeighCellList.

According to alternative embodiments herein, the cell reselection priority values are transmitted via the dedicated RRC message, which dedicated RRC message comprises an RRC-ConnectionRelease message.

The cell reselection priority values may be transmitted via a second information field, which second information field may be an extension of the freqPriorityListEUTRA field of the RRCConnectionRelease message.

Further details and advantages regarding the embodiments in the foregoing related to Action 401, are previously explained in conjunction with Action 301 of FIG. 3, and will not be further discussed.

Action 402

The UE 121 performs measurements on the cell having the highest priority according to the priority values received.

Thereby, it is suggested that the UE 121 e.g. performs measurements on a pico cell such as the third cell 133, which may not have been the case should prior art techniques have been utilized.

To sum up, the actions above described in conjunction with the exemplifying scenario of FIG. 4 have shown an approach in which cell specific priorities are added on top of the frequency specific priorities for cell reselection. Accordingly, the actions performed in the UE 121 may enable for cells on the same frequency, such as e.g. the second and third cells 132, 133 on the second frequency f2, to be prioritized differently.

Figure 5:
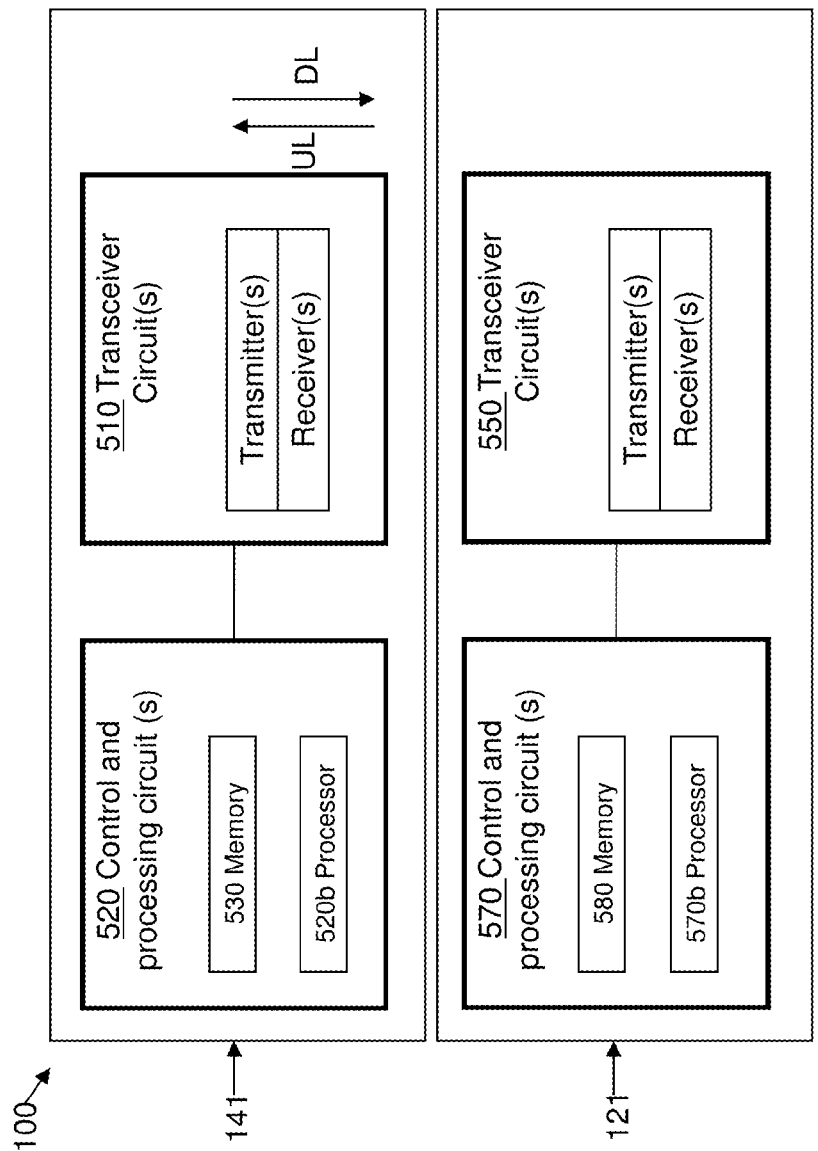
FIG. 5 is a schematic block diagram illustrating a radio base station and a UE according to exemplifying embodiments herein.

Embodiments of the radio base station 141 configured to perform the method actions for handling cell reselection for the UE 121 in the communication network 100, as described above in relation to FIG. 3, are depicted in FIG. 5.

As previously mentioned with reference to FIG. 3, it is assumed that the UE 121 is associated with the first cell 131 of the radio base station 141, which first cell 131 has the first frequency f1. Furthermore, the communications network 100 comprises the second cell 132 having the second frequency f2, which second cell 132 has at least partly overlapping coverage with the first cell 131. Additionally, the communications network 100 comprises the third cell 133 having the second frequency f2, which third cell 133 has at least partly overlapping coverage with the first cell 131.

The radio base station 141 is configured to transmit cell reselection priority values to the UE 121, wherein the cell reselection priority values comprise a first priority value for the second cell 132, and a second priority value for the third cell 133.

In some embodiments, the radio base station 141 comprises a transceiver circuit 510 configured to transmit cell reselection priority values to the UE 121, wherein the cell reselection priority values comprise a first priority value for the second cell 132, and a second priority value for the third cell 133.

The transceiver circuit 510 may e.g. comprise one or several transmitters and receivers for uplink (UL) and downlink (DL) communication with e.g. the UE 121.

Furthermore, the embodiments and features described herein in the radio base station 141 for handling cell reselection for the UE 121, may, as depicted in FIG. 5, be implemented through one or more processors, such as a processor 520b of a control and processing circuit(s) 520, together with computer program code for performing the functions and actions of the embodiments herein. The program code mentioned above may also be provided as a computer program product, for instance in the form of a data carrier carrying computer program code for performing the embodiments herein when being loaded into the radio base station 141. One such carrier may be in the form of a CD ROM disc. It is however feasible with other data carriers such as a memory stick. The computer program code may furthermore be provided as pure program code on a server and downloaded to the radio base station 141.

The control and processing circuit(s) 520 of the radio base station 141 may further comprise a memory 530 comprising one or more memory units. The memory 530 may be arranged to be used to store information about the cell reselection priority values, the second and third cells 132, 133, and/or data communication. The memory 530 may further be arranged to store data, configurations, schedulings, and applications, to perform the methods herein when being executed in the radio base station 141.

Those skilled in the art will also appreciate that the control and processing circuit(s) 520 and/or the transceiver circuit 510 described above may refer to a combination of analog and digital circuits, and/or one or more processors configured with software and/or firmware, e.g. stored in a memory such as the memory 530, that when executed by the one or more processors such as the processor 520b perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Additionally depicted in FIG. 5 are embodiments of the UE 121 configured to perform the method actions for handling cell reselection in the communications network 100, as described above in relation to FIG. 4.

As previously mentioned, it is assumed that the UE 121 is associated with the first cell 131 of the radio base station 141, which first cell 131 has the first frequency f1. Furthermore, the communications network 100 comprises the second cell 132 having the second frequency f2, which second cell 132 has at least partly overlapping coverage with the first cell 131. Additionally, the communications network 100 comprises the third cell 133 having the second frequency f2, which third cell 133 has at least partly overlapping coverage with the first cell 131.

The UE 121 is configured to receive cell reselection priority values from the radio base station 141, wherein the cell reselection priority values comprise a first priority value for the second cell 132, and a second priority value for the third cell 133.

In some embodiments, the UE 121 comprises a transceiver circuit 550 configured to receive cell reselection priority values from the radio base station 141, wherein the cell reselection priority values comprise a first priority value for the second cell 132, and a second priority value for the third cell 133.

The transceiver circuit 550 may comprise one or several transmitters and receivers for uplink (UL) and downlink (DL) communication with e.g. the radio base station 141.

Furthermore, the UE 121 is configured to perform measurements on the cell having the highest priority according to the priority values received. In some embodiments, the UE 121 comprises a control and processing circuit 570 configured to perform measurements on the cell having the highest priority according to the priority values received.

Furthermore, the embodiments and features described herein in the UE 121 for handling cell reselection may, as depicted in FIG. 5, be implemented through one or more processors, such as a processor 570b of the control and processing circuit(s) 570, together with computer program code for performing the functions and actions of the embodiments herein. The program code mentioned above may also be provided as a computer program product, for instance in the form of a data carrier carrying computer program code for performing the embodiments herein when being loaded into UE 121. One such carrier may be in the form of a CD ROM disc. It is however feasible with other data carriers such as a memory stick. The computer program code may furthermore be provided as pure program code on a server and downloaded to the UE 121.

The control and processing circuit(s) 570 of the UE 121 may further comprise a memory 580 comprising one or more memory units. The memory 580 may be arranged to be used to store information about the cell reselection priority table, the second and third cells 132, 133, and/or data communication. The memory 580 may further be arranged to store data, configurations, schedulings, and applications, to perform the methods herein when being executed in the UE 121.

Those skilled in the art will also appreciate that the control and processing circuit(s) 570 and/or the transceiver circuit 550 described above may refer to a combination of analog and digital circuits, and/or one or more processors configured with software and/or firmware, e.g. stored in a memory such as the memory 580, that when executed by the one or more processors such as the processor 570b perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

In the following, with support from FIGS. 6, 7 and 8, exemplifying desired cell reselection according to embodiments herein is described. For better understanding and for comparison, FIGS. 7 and 8 additionally visualizes cell reselection according to prior art with reference to FIG. 1, i.e. as of the previously mentioned exemplifying obstacle of UEs within the coverage of cell 3 staying camped on cell 1, and the utilization of the parameter qOffsetCell.

Figure 6:
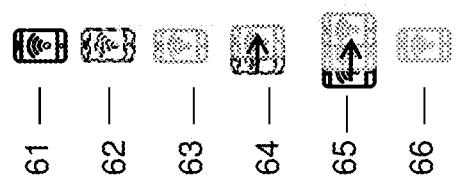
FIG. 6 is a schematic diagram indicating the meaning of different UE symbols.
Figure 7:
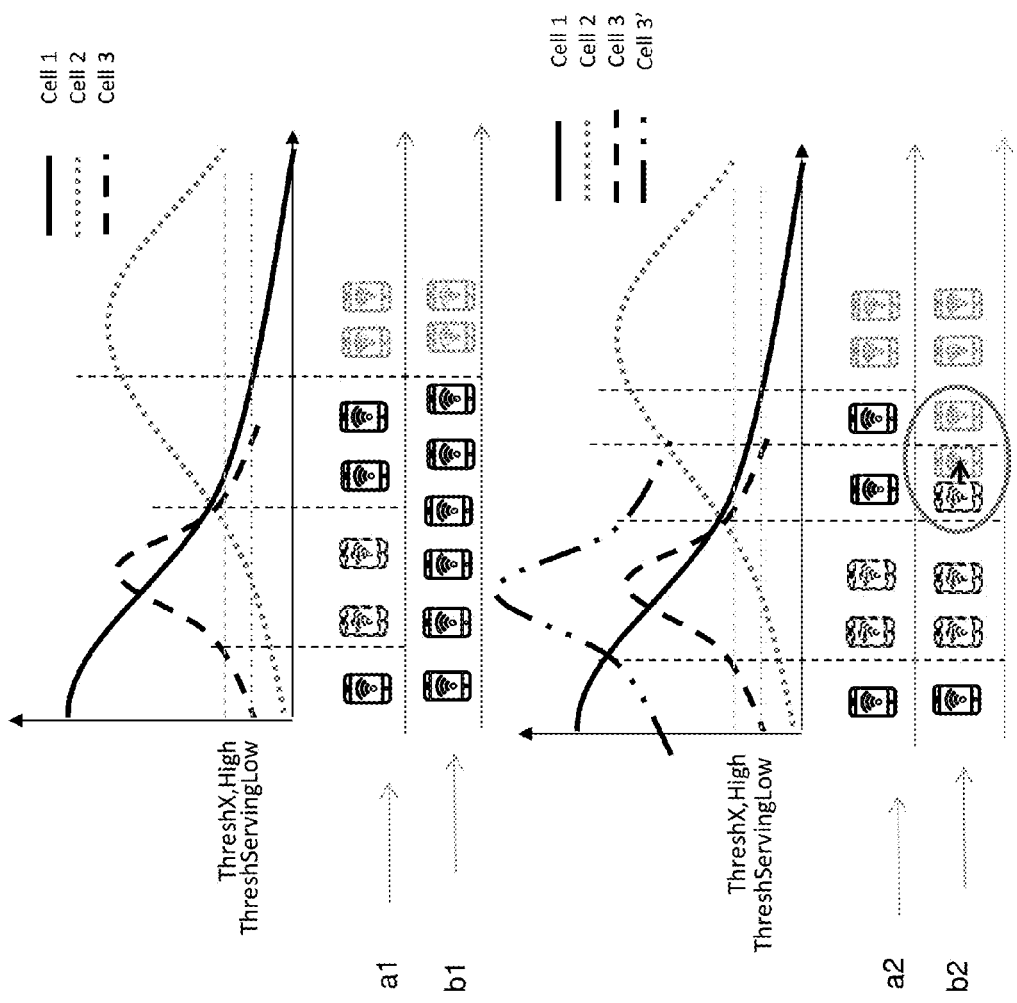
FIG. 7 is a schematic diagram illustrating a schematic view of an exemplifying first qOffsetCell problem arising from existing technology, and exemplifying embodiments reflecting the introduced cell reselection priority.
Figure 8:
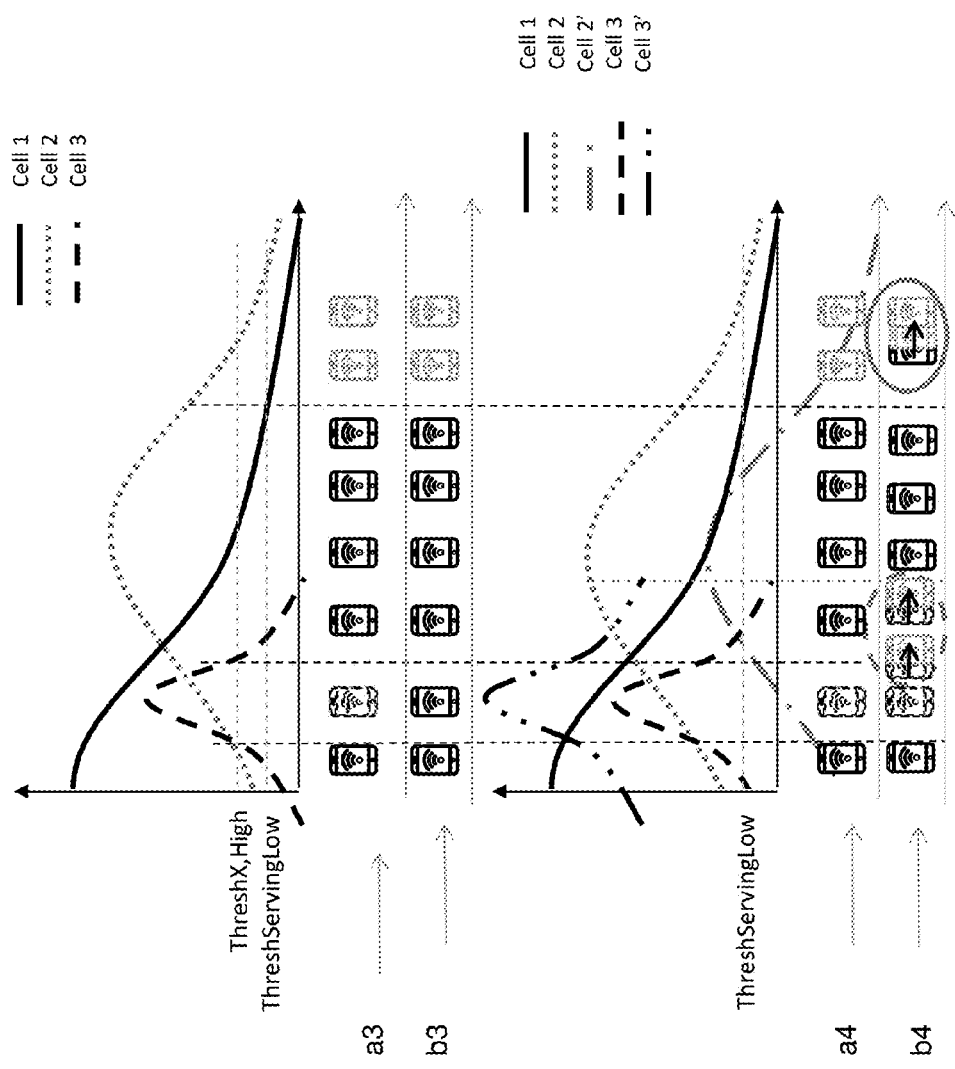
FIG. 8 is a schematic diagram illustrating a schematic view of an exemplifying second qOffsetCell problem arising from existing technology, and exemplifying embodiments reflecting the introduced cell reselection priority.

FIG. 6 indicates the meaning of different UE symbols illustrated in FIGS. 7 and 8, i.e. the symbol indicated by 61 refers to a UE such as the UE 121 being camped on cell1 such as the first cell 131, 62 to a UE being camped on cell3 such as the third cell 133, 63 to a UE being camped on cell2 such as the second cell 132, 64 to a UE first reselecting to cell3 and then, shortly after, reselection to cell2 happens. Furthermore, the symbol indicated by 65 refers to that a UE cannot remain on cell1 due to low signal level, and cannot reselect to cell2 due to offset, and therefore it should start cell selection to find cell2. Additionally, the symbol indicated by 66 refers to transition state.

In order to overcome said obstacle of UEs such as the UE 121 within the coverage of cell 3 such as the third cell 133 staying camped on cell 1 such as the first cell 131, it would, as previously mentioned, be desirable that UEs in idle mode, camped on cell 1, autonomously perform inter-frequency measurements and detects when they enter the coverage of cell 3. Furthermore, it would be desirable that UEs in idle mode, camped on cell 1, autonomously perform cell reselection to cell 3 when cell 3 becomes good enough. Additionally, it would be desirable that UEs in idle mode, camped on cell 1, avoid cell reselection to cell 2, as far as possible, in order not to unnecessarily affecting the load balance between cell 1 and cell 2. This is shown by scenarios a1-a4 in FIGS. 7 and 8, which respectively illustrate desired behaviour of a UE such as the UE 121 in idle mode when the UE 121 has been connected to cell1 such as the first cell 131 before idle mode and cell3 such as the third cell 133 has highest priority.

According to prior art however, as previously mentioned, and as shown by scenarios b1-b2 in exemplifying FIG. 7 which illustrate unwanted existing technology behaviour of a UE such as the UE 121 in idle mode when the UE has been connected to cell1 such as the first cell 131 before idle mode, and for the scenario of b1: f1 has higher priority than f2, and for scenario b2: f1 and f2 has the same priority and an offset is applied to cell3 such as the third cell 133; by setting a large negative offset for cell 3, indicated by cell3', there is a risk that this cell is prioritized over cell1 in the areas out of the good coverage of cell 3. After the UE reselects to cell3, it will trigger another reselection either to cell 1 or cell 2 such as the second cell 132, depending on the configuration, which both options are in contrast with the desired behaviour.

Furthermore, according to prior art as previously mentioned, and as shown by scenarios b3-b4 in exemplifying FIG. 8 which illustrate unwanted existing technology behaviour of a UE such as the UE 121 in idle mode when the UE has been connected to cell1 such as the first cell 131 before idle mode, and for the scenario of b3: f1 has higher priority than f2, and for the scenario of b4: f1 and f2 has the same priority and an offset is applied to cell3 such as the third cell 133; applying a large positive offset for cell 2 such as the second cell 132, indicated by cell2', may prohibit cell reselection to that cell even when the UE in cell 1 experiences poor coverage.

In FIG. 7 as well FIG. 8, the X-axis represents distance, radially, from the center of cell 1 through the neighbour cells 2 and 3, whereas the Y-axis represents Reference Symbol Received Power (RSRP) the UE measures of the respective cells 1, 2 and 3. Furthermore, ThreshServingLow indicates the threshold for the RSRP of the serving cell, below which the UE may reselect a neighbour cell will lower Cell Reselection Priority (CRP) than the serving cell, whereas Thresh-X,High indicates the threshold for the RSRP of a neighbour cell, above which the UE may reselect a neighbour cell with higher CRP than the serving cell.

Table 1 below shows an example configuration of Cell Reselection Priority, CRP, to be broadcasted in each of the cells, such as the first, second and third cells 131, 132, 133. This configuration implies that the carrier frequency of the current serving cell has a higher priority than other frequencies in the idle mode. This results into that the UEs, such as the UE 121, continue to camp on the previous cell and perform no measurements on lower priority frequencies until the signal level of the serving cell is less than a defined threshold (i.e. threshServingLow3GPP TS 36.304, "User Equipment (UE) procedures in idle mode", Rel-11 (V11.2.0)).

TABLE 1

Cell Reselection Priority (existing technology)

| | CRP broadcasted in the first cell (f1) | CRP broadcasted in the second cell (f2) | CRP broadcasted in the third cell (f2) |
|---|---|---|---|
| Frequency 1 (f1) | Prio 5 | Prio 4 | Prio 4 |
| Frequency 2 (f2) | Prio 4 | Prio 5 | Prio 5 |

The example configuration in Table 1 is a good basis for connected mode load balancing between the first cell 131 and the second cell 132 in that the effect of relocations of UE 121 between the first cell 131 and the second cell 132 performed in connected mode do likely sustain periods in idle mode. It preserves the traffic balance between the first cell 131 and the second cell 132 in idle mode and reduces the need for new relocations when UEs 121 in idle mode connect to the network 100 again.

However, a disadvantage of the example configuration in Table 1 is that it prevents UEs 121 camped on the first cell 131 of the first frequency f1, but within coverage of the third cell 133 of the second frequency f2, to perform the cell reselection from f1 to f2 into the third cell 133, as desired.

Table 2 below shows an improved configuration by considering the proposed cell specific reselection priority. By this configuration, the UEs 121 camped on the first cell 131 of the first frequency f1 shall measure on the second frequency f2 in order to search for the third cell 133, since it is configured with a higher priority than the serving cell. If the third cell 133 is found and satisfying the cell reselection criteria, the UE 121 shall reselect that cell, i.e., if:

$$\text{Srxlev(corresponding to the third cell 133)} > \text{Thresh}_{X,HighP}$$

(as specified in 3GPP TS 36.304, "User Equipment (UE) procedures in idle mode", Rel-11 (V11.2.0)).

TABLE 2

Cell Reselection Priority (proposed setting according to embodiments herein)

|  | CRP broadcasted in the first cell (f1) | CRP broadcasted in the second cell (f2) | CRP broadcasted in the third cell (f2) |
|---|---|---|---|
| Frequency 1 (f1) | Prio 5 | Prio 4 | Prio 4 |
| Frequency 2 (f2) | Prio 4 + (Cell 3: prio 6) | Prio 5 | Prio 5 |

With the configuration shown in Table 2, the third cell 133 of the second frequency f2 is able to attract UEs 121 in idle mode that are camped on the first cell 131 of the first frequency f1. In particular, UEs 121 which are stationary within the coverage of the third cell 133, or slowly roaming within the coverage of the third cell 133, are highly likely to be captured. Effectively, the arrangement also drains UEs 121 in connected mode from the first cell 131 to the third cell 133, as UEs which have reselected to the second frequency f2 in idle mode may connect to the third cell 133 when they connect to the network 100 the next time.

The connected mode load balancing between the first cell 131 and the second cell 132 is able to compensate for the impact the arrangement may have on the load balance between the first cell 131 and the second cell 132, by relocation of UEs 121 from the second cell 132 to the first cell 131 to compensate for UEs 121 which are captured in the third cell 133. Hence, the arrangement typically provides an offload of UEs 121 from both the first cell 131 and the second cell 132 into the third cell 133.

SystemInformationBlockType5

The Information Element SystemInformationBlockType5 (IE SIB5), which includes neighboring cell related information relevant for inter-frequency cell re-selection, may, as previously indicated according to embodiments herein, be updated with a new parameter specifying cell specific priority for cell reselection procedure.

Two alternatives of updating this IE according to embodiments herein are indicated in below (Alt. 1 and Alt. 2).

Alt. 1

In the first alternative, the cell specific priority information is added as a parameter in an extension of the interFreqNeighCellList in SIB5. A new interFreqNeighCellList-v12x0 field is introduced a 3GPP Rel-2 extension of SIB5. It provides a parallel list to the original interFreqNeighCellList where the cell specific priority information is added as an optional element in the cellSpecificReselectionPriority field. If present, it applies to the neighboring cell in the corresponding element of the original interFreqNeighCellList.

Alt. 2

The second alternative is a possibly more convenient and efficient way to achieve the same thing. In this case, a separate cellSpecificReselPrioList-r12 field is introduced in 3GPP Rel-12 for this purpose. It provides a single cell specific priority value and a list of Physical Cell Identifier (PCI) ranges identifying the set of neighboring cells for which the cell specific priority value applies. It does not rely on the original interFreqNeighCellList, which is often unnecessary when prioritized inter-frequency cell reselection applies, and it allows the use of PCI ranges to define the set of neighboring cells. The latter is quite efficient, if the network operator sets aside a range of PCI values for small cell deployment.

According to alternative embodiments, the second alternative can be replaced with a list of multiple cell specific priority values and for each such value a list of PCI ranges, if the restriction to a single cell specific priority value is considered too restrictive. This variant is not shown in the encoding example in below, but follows of embodiments herein.

| SystemInformationBlockType5 information element |
|---|
| ```
-- ASN1START
SystemInformationBlockType5 ::=                SEQUENCE {
    interFreqCarrierFreqList                       InterFreqCarrierFreqList,
    ...,
    lateNonCriticalExtension                       OCTET STRING         (CONTAINING
SystemInformationBlockType5-v8h0-IEs)               OPTIONAL              -- Need OP
}
SystemInformationBlockType5-v8h0-IEs ::=       SEQUENCE {
    interFreqCarrierFreqList-v8h0 SEQUENCE (SIZE (1. .maxFreq)) OF InterFreqCarrierFreqInfo-
v8h0            OPTIONAL,                           -- Need OP
    nonCriticalExtension                           SystemInformationBlockType5-v9e0-IEs     OPTIONAL    --
Need OP
}
SystemInformationBlockType5-v9e0-IEs ::=       SEQUENCE {
    interFreqCarrierFreqList-v9e0                  SEQUENCE (SIZE (1. .maxFreq)) OF
InterFreqCarrierFreqInfo-v9e0                      OPTIONAL, -- Need OR
    nonCriticalExtension                           SEQUENCE { }                             OPTIONAL    -- Need
OP
}
InterFreqCarrierFreqList ::=                   SEQUENCE (SIZE (1. .maxFreq)) OF
InterFreqCarrierFreqInfo
InterFreqCarrierFreqInfo ::=                   SEQUENCE {
    dl-CarrierFreq                                 ARFCN-ValueEUTRA,
    q-RxLev-Min                                    Q-RxLevMin,
    p-Max                                          P-Max                                    OPTIONAL,   --
Need OP
    t-ReselectionEUTRA                             T-Reselection,
    t-ReselectionEUTRA-SF                          SpeedStateScaleFactors                   OPTIONAL,   --
Need OP
    threshX-High                                   ReselectionThreshold,
    threshX-Low                                    ReselectionThreshold,
    allowedMeasBandwidth                           AllowedMeasBandwidth,
    presenceAntennaPort1                           PresenceAntennaPort1,
    cellReselectionPriority                        CellReselectionPriority                  OPTIONAL,   --
``` |

| SystemInformationBlockType5 information element |
| --- |
| ```
Need OP
    neighCellConfig              NeighCellConfig,
    q-OffsetFreq                 Q-OffsetRange                    DEFAULT dB0,
    interFreqNeighCellList       InterFreqNeighCellList           OPTIONAL,        --
Need OR
    interFreqBlackCellList       InterFreqBlackCellList           OPTIONAL,        --
Need OR
    ...,
    [[ q-QualMin-r9              Q-QualMin-r9                     OPTIONAL,        --
Need OP
        threshX-Q-r9             SEQUENCE {
            threshX-HighQ-r9         ReselectionThresholdQ-r9,
            threshX-LowQ-r9          ReselectionThresholdQ-r9
        }                                                         OPTIONAL         --
Cond RSRQ
    ]],
    [[ q-QualMinWB-r11           Q-QualMin-r9                     OPTIONAL         -- Cond
WB-RSRQ
    ]],
ALT.1 [[ interFreqNeighCellList-v12x0    InterFreqNeighCellList-v12x0     OPTIONAL         --
Need OR
ALT.2cellSpecificReselPrioList-r12       CellSpecificReselPrioList-r12    OPTIONAL         --
Need OR
    ]]
}
InterFreqCarrierFreqInfo-v8h0 ::=    SEQUENCE {
    multiBandInfoList                MultiBandInfoList                OPTIONAL         -- Need
OR
}
InterFreqCarrierFreqInfo-v9e0 ::=    SEQUENCE {
    dl-CarrierFreq-v9e0              ARFCN-ValueEUTRA-v9e0    OPTIONAL,  -- Cond dl-
FreqMax
    multiBandInfoList-v9e0           MultiBandInfoList-v9e0   OPTIONAL   -- Need OR
}
InterFreqNeighCellList ::=           SEQUENCE (SIZE (1..maxCellInter)) OF
InterFregNeighCellInfo
InterFregNeighCellInfo ::=           SEQUENCE {
    physCellId                           PhysCellId,
    q-OffsetCell                         Q-OffsetRange
}
ALT.1
InterFreqNeighCellList-v12x0 ::=     SEQUENCE (SIZE (1..maxCellInter)) OF
InterFreqNeighCellInfo-v12x0
InterFregNeighCellInfo-v12x0 ::=     SEQUENCE {
    cell SpecificReselectionPriority     Cell ReselectionPriority         OPTIONAL --
Need OR
}
ALT.2
CellSpecificReselPrioList-r12 ::=    SEQUENCE {
    cellSpecificReselectionPriority      Cell ReselectionPriority,
    specificReselPrioCellList            SpecificReselPrioCellList-r12
}
SpecificReselPrioCellList-r12 ::=    SEQUENCE (SIZE (1..maxCellSpecPrio)) OF PhysCellIdRange
InterFreqBlackCellList ::=           SEQUENCE (SIZE (1..maxCellBlack)) OFPhysCellIdRange
-- ASN1STOP
``` |

| SystemInformationBlockType5 field descriptions |
| --- |
| interFreqBlackCellList
List of blacklisted inter-frequency neighbouring cells.
interFreqCarrierFreqList
List of neighbouring inter-frequencies. E-UTRAN does not configure more than one entry for
the same physical frequency regardless of the E-ARFCN used to indicate this. If E-UTRAN
includes interFreqCarrierFreqList-v8h0 and/or interFreqCarrierFreqList-v9e0 it includes the
same number of entries, and listed in the same order, as in interFreqCarrierFreqList (i.e.
without suffix).
interFreqNeighCellList
List of inter-frequency neighbouring cells with specific cell re-selection parameters.
multiBandInfoList
Indicates the list of frequency bands in addition to the band represented by dl-CarrierFreq for which cell
reselection parameters are common. E-UTRAN indicates at most maxMultiBands frequency bands (i.e. the
total number of entries across both multiBandInfoList and multiBandInfoList-v9e0 is below this limit).
p-Max |

| SystemInformationBlockType5 field descriptions |
| --- |
| Value applicable for the neighbouring E-UTRA cells on this carrier frequency. If absent the UE applies the maximum power according to the UE capability.<br>q-OffsetCell<br>Parameter "$Qoffset_{s,\,n}$" in TS 36.304 [4].<br>q-OffsetFreq<br>Parameter "$Qoffset_{frequency}$" in TS 36.304 [4].<br>q-QualMin<br>Parameter "$Q_{qualmin}$" in TS 36.304 [4]. If the field is not present, the UE applies the (default) value of negative infinity for $Q_{qualmin}$.<br>q-QualMinWB<br>If this field is present, the UE shall, when performing RSRQ measurements, use a wider bandwidth in accordance with TS 36.133 [16] and apply the value of this field for the parameter "$Q_{qualmin}$" in TS 36.304 [4]. Otherwise, the UE applies the value of q-Qualmin instead.<br>threshX-High<br>Parameter "$Thresh_{X,\,HighP}$" in TS 36.304 [4].<br>threshX-HighQ<br>Parameter "$Thresh_{X,\,HighQ}$" in TS 36.304 [4].<br>threshX-Low<br>Parameter "$Thresh_{X,\,LowP}$" in TS 36.304 [4].<br>threshX-LowQ<br>Parameter "$Thresh_{X,\,LowQ}$" in TS 36.304 [4].<br>t-ReselectionEUTRA<br>Parameter "$Treselection_{EUTRA}$" in TS 36.304 [4].<br>t-ReselectionEUTRA-SF<br>Parameter "Speed dependent ScalingFactor for $Treselection_{EUTRA}$" in TS 36.304 [4]. If the field is not present, the UE behaviour is specified in TS 36.304 [4].<br>cellSpecificReselectionPriority<br>If present for a specific cell, it overrides the cellReselctionPriority for this cell. |

SIB5 is created by eNodeB. The UE applies the information provided in SIB5 when performing inter-frequency cell re-selection.

RRC Connection Release Message

As previously indicated according to embodiments herein, alternatively and/or additionally, the new information added in SIB5 for cell reselection may also be added to the RRC-ConnectionRelease message.

The RRCConnectionRelease message is sent from the eNodeB such as the first base station 141 to the UE 121. The UE 121 applies the provided cell reselection information.

According to embodiments herein, two alternatives are proposed for updating this IE as indicated in below (Alt. 3 and Alt. 4).

In both alternatives, an extension of the freqPriorityListEUTRA field may be provided in a new freqPriorityListEUTRA-v12x0 field. It is a parallel list that provides new optional information to each of the corresponding frequency entries in the original freqPriorityListEUTRA field.

Alt. 3

In the third alternative, the new optional information is an interFreqCellPriorityList-r12 field, which is used in the same way as the interFreqCellPriorityList field and its (Alt. 1) proposed extension in SIB5, except that in the RRCConnectionRelease message there is no original interFreqCellPriorityList field, so the interFreqCellPriorityList-r12 field is entirely new, and that the q-OffsetCell field in SIB5 is not included in the proposed extension of the RRCConnectionRelease message. If Alt. 1 is used in SIB5, Alt. 3 is also the natural choice in the RRCConnectionRelease message.

Alt. 4

In the fourth alternative, the new optional information in the freqPriorityListEUTRA-v12x0 field is reusing the same encoding of the cellSpecificReselPrioList-r12 field as proposed in Alt. 2 in SIB5. If Alt. 2 is chosen in SIB5, Alt. 4 is also the natural choice for the RRCConnectionRelease message.

| RRCConnectionRelease message |
| --- |
| ```
-- ASN1START
RRCConnectionRelease ::=            SEQUENCE {
    rrc-TransactionIdentifier           RRC-TransactionIdentifier,
    criticalExtensions                  CHOICE {
        c1                                  CHOICE {
            rrcConnectionRelease-r8             RRCConnectionRelease-r8-IEs,
            spare3 NULL, spare2 NULL, spare1 NULL
        },
        criticalExtensionsFuture            SEQUENCE { }
    }
}
RRCConnectionRelease-r8-IEs ::=     SEQUENCE {
    releaseCause                        ReleaseCause,
    redirectedCarrierinfo               RedirectedCarrierInfo           OPTIONAL,   --
Need ON
    idleModeMobilityControlInfo         IdleModeMobilityControlInfo     OPTIONAL,   --
Need OP
    nonCriticalExtension                RRCConnectionRelease-v890-IEs   OPTIONAL    --
Need OP
}
``` |

| RRCConnectionRelease message |
|---|

```
RRCConnectionRelease-v890-IEs ::=    SEQUENCE {
    lateNonCriticalExtension         OCTET STRING (CONTAINING RRCConnectionRelease-v9e0-
IEs)      OPTIONAL,        -- Need OP
    nonCriticalExtension             RRCConnectionRelease-v920-IEs       OPTIONAL    --
Need OP
}
-- Late non critical extensions
RRCConnectionRelease-v9e0-IEs ::=SEQUENCE {
    redirectedCarrierInfo-v9e0       RedirectedCarrierInfo-v9e0          OPTIONAL,   --
Cond NoRedirect-r8
    idleModeMobilityControlInfo-v9e0 IdleModeMobilityControlInfo-v9e0    OPTIONAL,   --
Cond IdleInfoEUTRA
    nonCriticalExtension             SEQUENCE { }                        OPTIONAL    --
Need OP
}
-- Regular non critical extensions
RRCConnectionRelease-v920-IEs ::=    SEQUENCE {
    cellInfoList-r9                  CHOICE {
        geran-r9                         CellInfoListGERAN-r9,
        utra-FDD-r9                      CellInfoListUTRA-FDD-r9,
        utra-TDD-r9                      CellInfoListUTRA-TDD-r9,
        ...,
        utra-TDD-r10                     CellInfoListUTRA-TDD-r10
    }                                                                    OPTIONAL,   -- Cond
Redirection
    nonCriticalExtension             RRCConnectionRelease-v1020-IEs      OPTIONAL    --
Need OP
}
RRCConnectionRelease-v1020-IEs ::= SEQUENCE {
    extendedWaitTime-r10             INTEGER (1..1800)   OPTIONAL,       -- Need ON
    nonCriticalExtension             SEQUENCE { }        OPTIONAL        -- Need OP
}
ReleaseCause ::=                     ENUMERATED {loadBalancingTAUrequired,
                                         other, cs-FallbackHighPriority-v1020, spare1}
RedirectedCarrierInfo ::=            CHOICE {
    eutra                                ARFCN-ValueEUTRA,
    geran                                CarrierFreqsGERAN,
    utra-FDD                             ARFCN-ValueUTRA,
    utra-TDD                             ARFCN-ValueUTRA,
    cdma2000-HRPD                        CarrierFreqCDMA2000,
    cdma2000-1xRTT                       CarrierFreqCDMA2000,
    ...,
    utra-TDD-r10                         CarrierFreqListUTRA-TDD-r10
}
RedirectedCarrierInfo-v9e0 ::=       SEQUENCE {
    eutra-v9e0                           ARFCN-ValueEUTRA-v9e0
}
CarrierFreqListUTRA-TDD-r10 ::=      SEQUENCE (SIZE (1..maxFreqUTRA-TDD-r10)) OF ARFCN-
ValueUTRA
IdleModeMobilityControlInfo ::=      SEQUENCE {
    freqPriorityListEUTRA                FreqPriorityListEUTRA           OPTIONAL,   --
Need ON
    freqPriorityListGERAN                FreqsPriorityListGERAN          OPTIONAL,   --
Need ON
    freqPriorityListUTRA-FDD             FreqPriorityListUTRA-FDD        OPTIONAL,   --
Need ON
    freqPriorityListUTRA-TDD             FreqPriorityListUTRA-TDD        OPTIONAL,   --
Need ON
    bandClassPriorityListHRPD            BandClassPriorityListHRPD       OPTIONAL,   --
Need ON
    bandClassPriorityList1XRTT           BandClassPriorityList1XRTT      OPTIONAL,   --
Need ON
    t320                                 ENUMERATED {
                                             min5, min10, min20, min30, min60, min120,
min180,
                                             spare1}                    OPTIONAL,   --
Need OR
    ...,
    [[ freqPriorityListEUTRA-v12x0       FreqPriorityListEUTRA-v12x0     OPTIONAL,   --
Need OR
    ]]
}
IdleModeMobilityControlInfo-v9e0 ::= SEQUENCE{
    freqPriorityListEUTRA-v9e0           SEQUENCE (SIZE (1..maxFreq)) OF FreqPriorityEUTRA-
v9e0
}
```

| RRCConnectionRelease message | |
|---|---|
| FreqPriorityListEUTRA ::= | SEQUENCE (SIZE (1..maxFreq)) OF FreqPriorityEUTRA |
| FreqPriorityEUTRA ::= | SEQUENCE { |
|   carrierFreq |   ARFCN-ValueEUTRA, |
|   cell ReselectionPriority |   Cell ReselectionPriority |
| } | |
| FreqPriorityEUTRA-v9e0 ::= | SEQUENCE { |
|   carrierFreq-v9e0 |   ARFCN-ValueEUTRA-v9e0    OPTIONAL  -- Cond EARFCN-max |
| } | |
| FreqPriorityListEUTRA-v12x0 ::= | SEQUENCE (SIZE (1..maxFreq)) OF FreqPriorityEUTRA-v12x0 |
| FreqPriorityEUTRA-v12x0 ::= | SEQUENCE { |
| ALT.1 interFreqCellPriorityList-r12 Need OR |   InterFreqCellPriorityList-r12    OPTIONAL  -- |
| ALT.2 cellSpecificReselPrioList-r12 Need OR |   CellSpecificReselPrioList-r12    OPTIONAL  -- |
| } | |
| ALT.1 | |
| InterFreqCellPriorityList-r12 ::= | SEQUENCE (SIZE (1..maxCellInter)) OF InterFreqCellPriorityInfo-r12 |
| InterFreqCellPriorityInfo-r12 ::= | SEQUENCE { |
|   physCellId |   PhysCellId, |
|   cell SpecificReselectionPriority Need OR |   Cell ReselectionPriority    OPTIONAL  -- |
| } | |
| FreqsPriorityListGERAN ::= | SEQUENCE (SIZE (1..maxGNFG)) OF FreqsPriorityGERAN |
| FreqsPriorityGERAN ::= | SEQUENCE { |
|   carrierFreqs |   CarrierFreqsGERAN, |
|   cell ReselectionPriority |   Cell ReselectionPriority |
| } | |
| FreqPriorityListUTRA-FDD ::= | SEQUENCE (SIZE (1..maxUTRA-FDD-Carrier)) OF FreqPriorityUTRA-FDD |
| FreqPriorityUTRA-FDD ::= | SEQUENCE { |
|   carrierFreq |   ARFCN-ValueUTRA, |
|   cell ReselectionPriority |   Cell ReselectionPriority |
| } | |
| FreqPriorityListUTRA-TDD ::= | SEQUENCE (SIZE (1..maxUTRA-TDD-Carrier)) OF FreqPriorityUTRA-TDD |
| FreqPriorityUTRA-TDD ::= | SEQUENCE { |
|   carrierFreq |   ARFCN-ValueUTRA, |
|   cell ReselectionPriority |   Cell ReselectionPriority |
| } | |
| BandClassPriorityListHRPD ::= | SEQUENCE (SIZE (1..maxCDMA-BandClass)) OF BandClassPriorityHRPD |
| BandClassPriorityHRPD ::= | SEQUENCE { |
|   bandClass |   BandclassCDMA2000, |
|   cell ReselectionPriority |   Cell ReselectionPriority |
| } | |
| BandClassPriorityList1XRTT ::= | SEQUENCE (SIZE (1..maxCDMA-BandClass)) OF BandClassPriority1XATT |
| BandClassPriority1XATT ::= | SEQUENCE { |
|   bandClass |   BandclassCDMA2000, |
|   cell ReselectionPriority |   Cell ReselectionPriority |
| } | |
| CellInfoListGERAN-r9 ::= | SEQUENCE (SIZE (1..maxCellInfoGERAN-r9)) OF CellInfoGERAN-r9 |
| CellInfoGERAN-r9 ::= | SEQUENCE { |
|   physCellId-r9 |   PhysCellIdGERAN, |
|   carrierFreq-r9 |   CarrierFregGERAN, |
|   systemInformation-r9 |   SystemInfoListGERAN |
| } | |
| CellInfoListUTRA-FDD-r9 ::= | SEQUENCE (SIZE (1..maxCellInfoUTRA-r9)) OF CellInfoUTRA-FDD-r9 |
| CellInfoUTRA-FDD-r9 ::= | SEQUENCE { |
|   physCellId-r9 |   PhysCellIdUTRA-FDD, |
|   utra-BCCH-Container-r9 |   OCTET STRING |
| } | |
| CellInfoListUTRA-TDD-r9 ::= | SEQUENCE (SIZE (1..maxCellInfoUTRA-r9)) OF CellInfoUTRA-TDD-r9 |
| CellInfoUTRA-TDD-r9 ::= | SEQUENCE { |
|   physCellId-r9 |   PhysCellIdUTRA-TDD, |
|   utra-BCCH-Container-r9 |   OCTET STRING |
| } | |
| CellInfoListUTRA-TDD-r10 ::= | SEQUENCE (SIZE (1..maxCellInfoUTRA-r9)) OF CellInfoUTRA-TDD-r10 |

| RRCConnectionRelease message |
|---|
| CellInfoUTRA-TDD-r10 ::=      SEQUENCE {<br>    physCellId-r10                    PhysCellIdUTRA-TDD,<br>    carrierFreq-r10                   ARFCN-ValueUTRA,<br>    utra-BCCH-Container-r10           OCTET STRING<br>}<br>-- ASN1STOP |

| RRCConnectionRelease field descriptions |
|---|
| carrierFreq or bandClass<br>The carrier frequency (UTRA and E-UTRA) and band class (HRPD and 1xRTT) for which the associated cellReselectionPriority is applied.<br>carrierFreqs<br>The list of GERAN carrier frequencies organised into one group of GERAN carrier frequencies.<br>cellInfoList<br>Used to provide system information of one or more cells on the redirected inter-RAT carrier frequency. The system information can be used if, upon redirection, the UE selects an inter-RAT cell indicated by the physCellId and carrierFreq (GERAN and UTRA TDD) or by the physCellId (other RATs). The choice shall match the redirectedCarrierInfo.<br>extendedWaitTime<br>Value in seconds for the wait time for Delay Tolerant access requests.<br>freqPriorityListX<br>Provides a cell reselection priority for each frequency, by means of separate lists for each RAT (including E-UTRA). The UE shall be able to store at least 3 occurrences of FreqsPriorityGERAN. If E-UTRAN includes freqPriorityListEUTRA-v9e0 it includes the same number of entries, and listed in the same order, as in freqPriorityListEUTRA (i.e. without suffix).<br>idleModeMobilityControlInfo<br>Provides dedicated cell reselection priorities. Used for cell reselection as specified in TS 36.304 [4].<br>redirectedCarrierInfo<br>The redirectedCarrierInfo indicates a carrier frequency (downlink for FDD) and is used to redirect the UE to an E-UTRA or an inter-RAT carrier frequency, by means of the cell selection upon leaving RRC_CONNECTED as specified in TS 36.304 [4]. E-UTRAN only applies value utra-TDD-r10 for redirectedCarrierInfo if cellInfoList-r9 is set to utra-TDD-r10.<br>releaseCause<br>The releaseCause is used to indicate the reason for releasing the RRC Connection. The cause value cs-FallbackHighPriority is only applicable when redirectedCarrierInfo is present with the value set to utra-FDD or utra-TDD.<br>E-UTRAN should not set the releaseCause to loadBalancingTAURequired or to cs-FallbackHighPriority if the extendedWaitTime is present.<br>systemInformation<br>Container for system information of the GERAN cell i.e. one or more System Information (SI) messages as defined in TS 44.018 [45, table 9.1.1].<br>t320<br>Timer T320 as described in section 7.3. Value minN corresponds to N minutes.<br>utra-BCCH-Container<br>Contains System Information Container message as defined in TS 25.331 [19].<br>cellSpecificReselectionPriority<br>If present for a specific cell, it overrides the cellReselctionPriority for this cell. |

The embodiments and features described herein are not limited to the above described preferred embodiments. For instance, embodiments herein are described in terms of E-UTRAN technology, commonly referred to as LTE technology. However, the above examples are given for illustrative purposes, and similar scenarios may be valid in a variety of wireless communications networks 100. For instance, as apparent to the person skilled in the art, embodiments herein are readily applicable also to other cellular technologies, e.g. Wideband Code Division Multiple Access (WCDMA) or Global System for Mobile Communications (GSM), mutatis mutandis. Further various alternatives, modifications and equivalents may be used. A person skilled in the art will be able to modify the teachings herein according to his knowledge without departing from the scope herein. Therefore, the above embodiments should not be taken as limiting the scope, which is defined by the appending claims.

When using the word "comprise" or "comprising" it shall be interpreted as non-limiting, i.e. meaning "comprise at least of".

Furthermore, the use of terms eNodeB, base station and radio base station are considered equivalent throughout the present application.

ABBREVIATIONS

3GPP Third Generation Partnership Project (telecommunications standards)
eNB EUTRA Node-B
UE User Equipment
SIB System Information Block
RSRP Reference Signal Received Power
RSRQ Reference Signal Received Quality
Srxlev Cell selection RX level value (dB)
RAT Radio Access Technology
FDD Frequency Division Duplex
TDD Time Division Duplex
LTE Long Term Evolution
HetNet Heterogeneous Network

The invention claimed is:

1. A method in a radio base station for handling cell reselection for a user equipment, UE, in a wireless communications network, which UE is associated with a first cell of the radio base station, said first cell having a first frequency,
wherein said wireless communications network comprises a second cell having a second frequency, said second cell having at least partly overlapping coverage with said first cell, and a third cell having said second frequency, said third cell having at least partly overlapping coverage with said first cell,
said method comprising:
transmitting cell reselection priority values to the UE, wherein said cell reselection priority values comprise a first priority value for said second cell, and a second priority value for said third cell.

2. The method according to claim 1, wherein said first priority value and said second priority value are different.

3. The method according to claim 1, wherein said cell reselection priority values are transmitted via system information and/or in a dedicated Radio Resource Control, RRC, message.

4. The method according to claim 3, wherein said cell reselection priority values are transmitted via said system information, which system information comprises Information Element, IE, SystemInformationBlockType5, SIB5.

5. The method according to claim 4, wherein said cell reselection priority values are transmitted via a first information field, said first information field being an extension of the SIB5 interFreqNeighCellList.

6. The method according to claim 3, wherein said cell reselection priority values are transmitted via said dedicated RRC message, which dedicated RRC message comprises an RRCConnectionRelease message.

7. The method according to claim 6, wherein said cell reselection priority values are transmitted via a second information field, said second information field being an extension of the freqPriorityListEUTRA field of said RRCConnectionRelease message.

8. A method in a user equipment, UE, for handling cell reselection in a wireless communications network, which UE is associated with a first cell of a radio base station, said first cell having a first frequency,
wherein said wireless communications network comprises a second cell having a second frequency, said second cell having at least partly overlapping coverage with said first cell, and a third cell having said second frequency, said third cell having at least partly overlapping coverage with said first cell;
said method comprising:
receiving cell reselection priority values from said radio base station, wherein said cell reselection priority values comprise a first priority value for said second cell, and a second priority value for said third cell, and
performing measurements on the cell having the highest priority according to the priority values received.

9. The method according to claim 8, wherein said first priority value and said second priority value are different.

10. The method according to claim 8, wherein said cell reselection priority values are transmitted via system information and/or in a dedicated Radio resource Control, RRC, message.

11. The method according to claim 10, wherein said cell reselection priority values are transmitted via said system information, which system information comprises Information Element, IE, SystemInformationBlockType5, SIB5.

12. The method according to claim 11, wherein said cell reselection priority values are transmitted via a first information field, said first information field being an extension of the SIB5 interFreqNeighCellList.

13. The method according to claim 10, wherein said cell reselection priority values are transmitted via said dedicated RRC message, which dedicated RRC message comprises an RRCConnectionRelease message.

14. The method according to claim 13, wherein said cell reselection priority values are transmitted via a second information field, said second information field being an extension of the freqPriorityListEUTRA field of said RRCConnectionRelease message.

15. A radio base station adapted for handling cell reselection for a user equipment, UE, in a wireless communications network, which UE is associated with a first cell of said radio base station, said first cell having a first frequency,
wherein said wireless communications network comprises a second cell having a second frequency, said second cell having at least partly overlapping coverage with said first cell, and a third cell having said second frequency, said third cell having at least partly overlapping coverage with said first cell;
said radio base station being configured to:
transmit cell reselection priority values to said UE, wherein said cell reselection priority values comprise a first priority value for said second cell, and a second priority value for said third cell.

16. A user equipment, UE, adapted for handling cell reselection in a wireless communications network, which UE is associated with a first cell of a radio base station, said first cell having a first frequency,
wherein said wireless communications network comprises a second cell having a second frequency, said second cell having at least partly overlapping coverage with said first cell, and a third cell having said second frequency, said third cell having at least partly overlapping coverage with said first cell,
said UE being configured to:
receive cell reselection priority values from said radio base station, wherein said cell reselection priority values comprise a first priority value for said second cell, and a second priority value for said third cell, and
perform measurements on the cell having the highest priority according to the priority values received.

* * * * *